Figure 1:
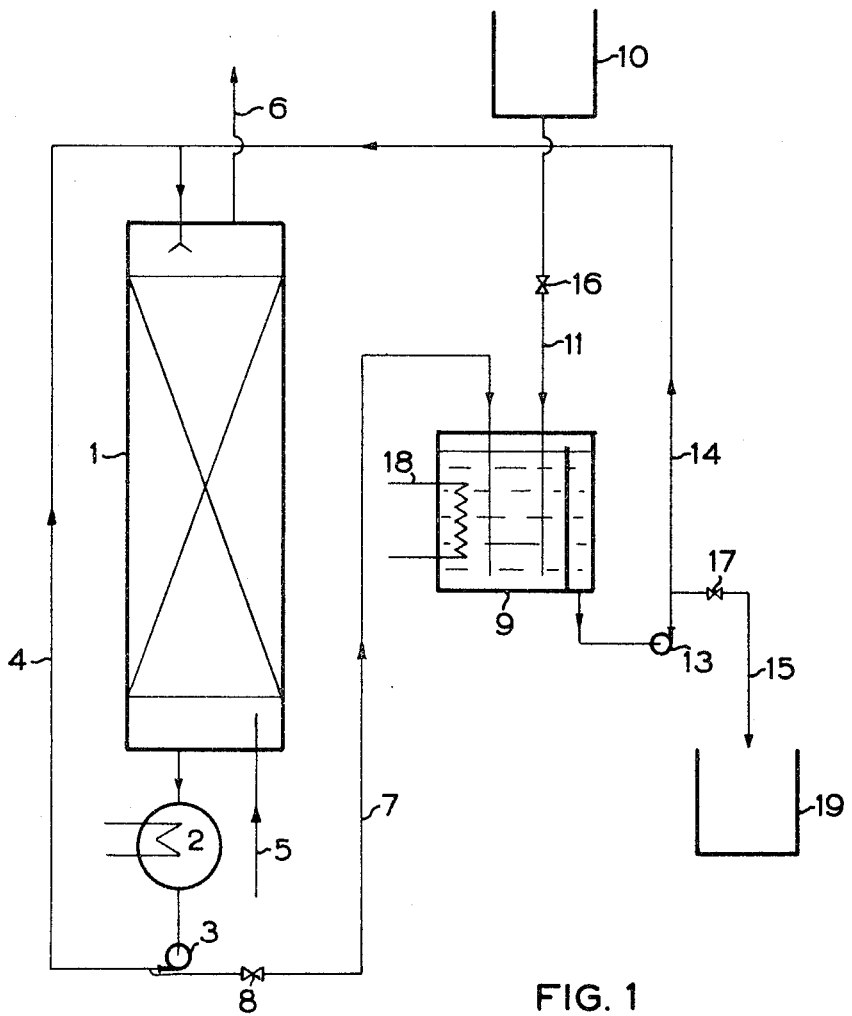

United States Patent Office 3,269,954
Patented August 30, 1966

3,269,954
PROCESS FOR PREPARING A NITROSATING ACID
Abraham H. de Rooij, Geleen, Netherlands, assignor to Stamicarbon N.V., Heerlen, Netherlands
Filed Feb. 28, 1963, Ser. No. 261,729
Claims priority, application Netherlands, Mar. 2, 1962, 275,510
9 Claims. (Cl. 252—182)

The present invention relates to a process for preparing a solution of nitrosyl sulphuric acid in anhydrous sulphuric acid or oleum.

It is known to carry out nitrosation reactions (i.e. reactions wherein a nitroso-group (NO) is introduced into an organic compound according to the reaction equation $RH + NO^+ \rightarrow RNO + H^+$, in which R represents an aliphatic cyclic or aromatic radical) using a solution of nitrosylsulphuric acid ($NOHSO_4$) in oleum or sulphuric acid as the nitrosating agent (see Belgian patent specification No. 582,793, Example 16). For convenience, this solution is hereinafter referred to as nitrosating acid.

The nitrosating acid used heretofore has been obtained by dissolving solid nitrosyl sulfuric acid in oleum. A drawback attached to this particular method of preparation is that it is first necessary to prepare solid nitrosyl sulfuric acid and separate the solid off, and this is a laborious operation.

Furthermore, the preparation of solid nitrosyl sulfuric acid on a commercial scale, for example, starts from red-fuming nitric acid into which $SO_2$ is introduced. The $SO_2$ reacts with the nitric acid according to the reaction equation $SO_2 + HNO_3 \rightarrow NOHSO_4$ with simultaneous formation of nitrosyl sulfuric acid. The separation of the nitrosyl sulfuric acid crystals from the red-fuming nitric acid makes heavy demands on the apparatus as regards its corrosion-resistance. Additionally, solid nitrosyl sulfuric acid is susceptible to moisture, and readily deliquesces while decomposing according to the reaction equation $2NOHSO_4 + H_2O \rightarrow N_2O_3 + 2H_2SO_4$.

Another unattractive feature of the prior method of preparing the nitrosating acid is that the reaction between $SO_2$ and $HNO_3$ has to be carried out at a relatively low temperature, notably at a temperature which does not exceed 5° C. Otherwise the nitrosyl sulfuric acid which is formed decomposes again by reacting with the nitric acid, with the formation of $NO_2$ and sulfuric acid.

It is also known that solution of nitrosyl sulfuric acid in sulfuric acid are obtained in the preparation of sulfuric acid according to the lead chamber process. In the latter process, nitrous gases are absorbed in about 78% by weight of sulfuric acid in the "Gay-Lussac" tower, with simultaneous formation of the so-called nitrose i.e. a solution of nitrosyl sulfuric acid in sulfuric acid. However, this "nitrose" cannot be used as a nitrosation agent, as it contains only 3% by weight of nitrosyl sulfuric acid in addition to 22.5% by weight of water. Nitrosation reactions require more concentrated acids which preferably contain free $SO_3$. The principal object of the present invention is to provide a new and improved process for preparing nitrosating acid which is free from the prior art problems discussed above. A more specific object is the provision of a simple, continuous process for the preparation of nitrosating acid using simple elements, such as nitrous gases, contact gas, oleum sulfuric acid, and water. Other objects will also be apparent from the description which follows.

Broadly stated, the present process comprises absorbing nitrous gases in an amount of absorbent comprising a solution of nitrosyl sulfuric acid in sulfuric acid, adding $SO_3$ either in the form of $SO_3$-containing gases, or in the form of oleum to this absorbent, and discharging the resulting nitrosating acid from the system, the amount of nitrosating acid produced and discharged corresponding to the amount of absorbed nitrous gases. It appears that the nitrous gases and the $SO_3$ cannot be introduced into the absorbent at the same time or as a mixture, because then a solid compound, presumably the nitrosyl sulfuric acid anhydride, separates off with simultaneous, violent evolution of heat.

Nitrous gases which are used in industrial practice are generally obtained from an ammonia combustion installation of a nitric acid plant and these gases do not initially contain sufficient water vapour to permit formation of nitrosyl sulfuric acid in sulfuric acid in the present process. In that event, the additional amount needed can simply be added to the absorption system in the form of sulfuric acid or water-containing sulfuric acid, for the overall reaction:

$$NO + NO_2 + 2SO_3 + H_2O \rightarrow 2NOHSO_4$$

in fact proceeds via sulfuric acid according to the equations:

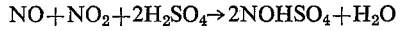
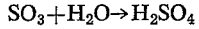

Usually the amount of water vapour present in the nitrous gases will fall in the range of 7 to 70% by weight of the total NO and $NO_2$ content, for best results although amounts outside this range may also be used.

To achieve a good absorption of the nitrous gases in the absorbent and at the same time the highest possible yield of nitrosyl sulfuric acid, the degree of oxidation of the nitrous gases must be at least 0.5, i.e. they must contain an amount of NO which is at least equal to the amount of $NO_2$. A degree of oxidation lower than 0.5, that is to say, an excess of NO with respect to $NO_2$, gives rise to losses because this excess is not absorbed. A degree of oxidation higher than 0.5 causes formation of nitric acid in an amount corresponding to the excess of $NO_2$. It is known that the use of some nitric acid, e.g. an amount smaller than 10 mol. percent with respect to the amount of nitrosyl sulfuric acid used, is advantageous in certain nitrosation reactions. Consequently, if a nitrosating acid with such a nitric acid content is to be prepared, it is advantageous in the present process to start from nitrous gases with a degree of oxidation higher than 0.5, for instance a degree of oxidation between 0.5 and 0.6. The temperature at which the absorption of the nitrous gases takes place is determined by the requirement that deposition of solid nitrosyl sulfuric acid in the absorbent, must be avoided. On the other hand, the temperature must not be so high as to cause a strong lowering of the absorption yield and an undue increase in the amounts of nonabsorbed gases in the vent gases. In practice it will usually suffice to maintain the temperature of the absorbent between 0 and 40° C.

In case the process is carried out continuously by means of a circulating amount of absorbent, the composition of the absorbent must be approximately equal to that of the nitrosating acid to be prepared. However, the ratio of the components $NOHSO_4$, $H_2SO_4$, and $SO_3$ in this composition can be varied between wide limits and is, in fact, determined only by the requirement that the acid must be liquid in the temperature range in which the absorption takes place.

The amount of absorbent required for starting the process can be carefully built up by alternately absorbing small amounts of nitrous gases and $SO_3$ in sulfuric acid, or by first preparing solid nitrosyl sulfuric acid in a known way and dissolving it in sulfuric acid or oleum.

Figure 2:
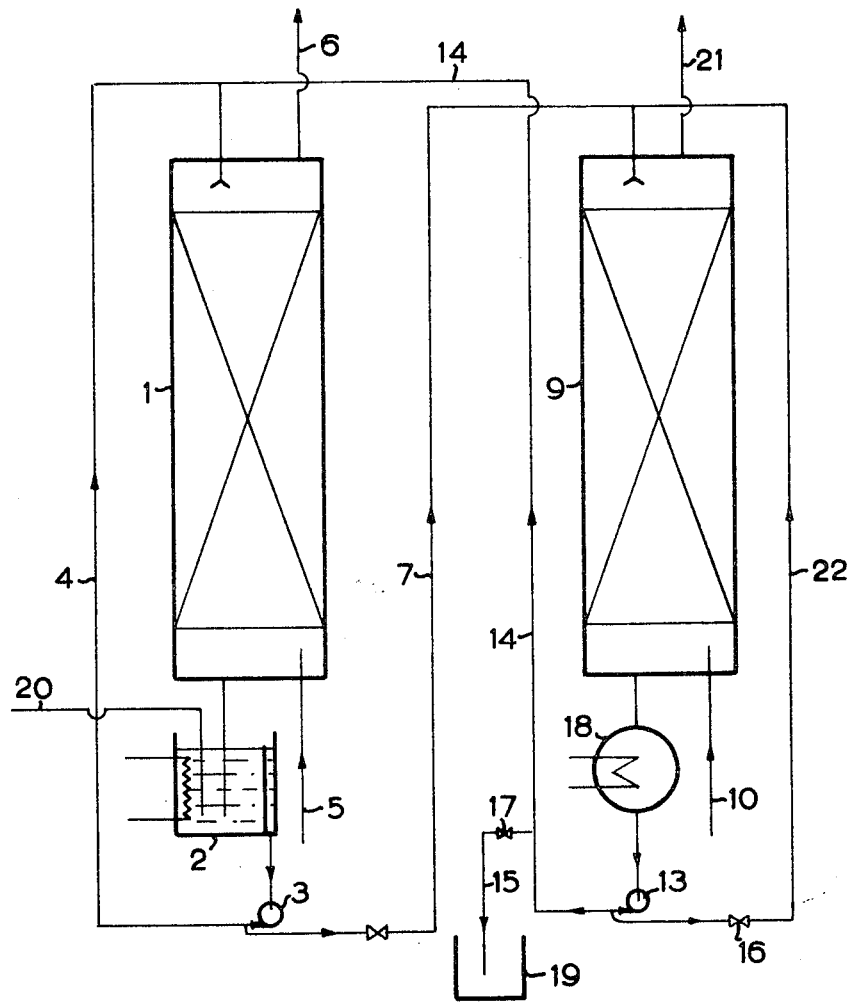

Certain continuous processes according to the invention, selected by way of example, are diagrammatically shown in FIGURES 1 and 2. Thus, in FIG. 1, the absorbent, consisting of nitrosyl sulfuric acid dissolved in sulfuric acid, circulates over an absorption column 1 packed with the usual type of packing material, or other elements which promote a good contact between the absorbent and the gas to be introduced, via a cooler 2, pump 3, and conduit 4. The nitrous gases are supplied through conduit 5 while non-absorbed gases escape through discharge conduit 6.

Part of the circulating absorbent is carried off to mixing vessel 9 via conduit 7. This mixing vessel also receives oleum from storage vessel 10 via conduit 11. The contents of the mixing vessel are kept at a uniform temperature level in that the heat produced during mixing is carried off via cooling spiral 18. Part of the contents of mixing vessel 9 is fed as absorbent to absorption column 1 via pump 13 and conduit 14, the remaining part being collected as produced nitrosating acid in reservoir 19 via conduit 15. The valves 8, 16, and 17 serve to control the amounts of liquid to be passed through the conduits 7, 11 and 15. Consequently, a solution of nitrosyl sulfuric acid in free $SO_3$-containing sulfuric acid is, in fact, passed over absorption column 1. The absorbed gases (NO, $NO_2$, and $H_2O$) react in the solution with simultaneous formation of fresh nitrosyl sulfuric acid and sulfuric acid. The amount of $SO_3$ consumed is supplemented in mixing vessel 9 with oleum from reservoir 10.

With the procedure shown in FIGURE 2 the $SO_3$ is not supplemented with oleum. Instead $SO_3$-containing contact gas is fed to a second absorption column 9, which, in fact, takes over the function of mixing vessel 9 shown in FIGURE 1. Here again an absorbent consisting of a solution of nitrosyl sulfuric acid and sulfuric acid circulates over an absorption column via reservoir 2, pump 3 and conduit 4. The elimination of the heat of absorption takes place in reservoir 2, where also sulfuric acid and or water can be supplemented via supply pipe 20. Part of the circulating absorbent is fed to the top of absorption column 9 via conduit 7. Furthermore an amount of absorbent is circulated over absorption column 9 via cooler 18, pump 13, and conduit 22, for absorbing the contact gas introduced via conduit 10. An amount of absorbent is fed back to absorption column 1 via pump 13 and conduit 14. The nitrosating acid produced is collected in reservoir 19 via conduit 15.

The invention is illustrated, but not limited, by the following examples:

*Example 1*

Using the system of FIGURE 1, a total amount of 4090 kg. of absorbent, 3600 kg. of which are supplied through conduit 4 and 490 kg. through conduit 14, are passed over absorption column 1 to produce about 200 kg./hour of nitrosating acid composed of:

33.4% by weight of $NOHSO_4$
57.9% by weight of $H_2SO_4$
8.7% by weight of $SO_3$ The mixture flowing through conduit 4 is composed of 44.5% by weight of $NOHSO_4$
55.5% by weight of $H_2SO_4$ About 100 m.$^3$ of nitrous gases with a dew point of 38° C., a degree of oxidation equal to 0.5, and an (NO+$NO_2$) content of 12% by volume, are supplied into the base of column 1. This is equivalent to 20 kg. of $N_2O_3$ and 5 kg. of $H_2O$ introduced hourly. Of the total amount of 4115 kg./hour of liquid flowing from the base of column 1, 3600 kg./hour are returned to the column top through conduit 4, the remaining 515 kg./hour being fed to mixing vessel 9 and mixed there with 170 kg./hour of oleum containing 35.2% by weight of free $SO_3$. The mixing vessel then contains a total amount of 685 kg./hour of nitrosating acid of the desired composition, 490 kg. of which are fed to the top of absorption column 1 and the remaining 195 kg./hour being discharged as production.

*Example 2*

To obtain the same production of nitrosating acid of the same composition from the same supply of nitrous gases as mentioned in Example 1, all amounts being amounts per hour, 4090 kg. of absorbent are passed again over absorption column 1 in the manner shown in FIGURE 2. Of the indicated amount, 2570 kg. of the said amount containing 36.5% by weight of $NOHSO_4$
63.5% by weight of $H_2SO_4$ are supplied through conduit 4, and 1520 kg., equal in composition to the acid to be produced, i.e.

33.4% by weight of $NOHSO_4$
57.9% by weight of $H_2SO_4$
8.7% by weight of $SO_3$ through conduit 14.

4115 kg. of $N_2O_3$-carrying absorbent flow from the base of column 1. In the cooling vessel 2, which also serves as mixing vessel, this is mixed with 20 kg. of water. From this vessel 1565 kg. are passed to the top of absorption column 2. 23,460 kg. of absorbent, equal in composition to the nitrosating acid to be produced, is also circulated over this column via conduit 22. 650 m.$^3$ of contact gas containing 7% by volume of $SO_3$, i.e. 150 kg. of $SO_3$, are introduced into the base of column 2. All in all, 25,180 kg. are discharged from absorption column 2 via cooler 18, of which, in consequence, about 93% is recycled over the column, about 6% is fed to absorption column 1, and the remaining part is discharged from the system as production.

*Example 3*

Instead of supplying water to mixing vessel 2, as described in Example 2, it is also possible to supply sulfuric acid, for instance 98% sulfuric acid. In that case the amount of $SO_3$ to be supplied to absorption column 2 is much smaller. Under virtually identical conditions 300 m.$^3$ of contact gas can then be introduced into absorption column 2 while passing a total amount of 11,365 kg. of absorbent over this column. Of this amount, 10,640 kg. having the same composition as acid to be produced, are fed via conduit 22, and 725 kg. from mixing vessel 2 via conduit 7. 4115 kg. of $N_2O_3$-carrying absorbent flow into mixing vessel 2. This is mixed with 105 kg. of 98% $H_2SO_4$. Of the total amount of 4220 kg. so obtained, 3495 kg. are recirculated over absorption column 1, and 725 kg. are supplied to the $SO_3$-absorption column 2.

It will be appreciated that various modifications may be made in the invention described. Accordingly, the scope of the invention is defined in the following claims wherein:

I claim:
1. A process for preparing a nitrosating acid which comprises providing an absorbent at a temperature between about 0° and about 40° C., said absorbent comprising a solution of nitrosyl sulfuric acid in sulfuric acid, absorbing nitrous gases obtained by combustion of ammonia in said absorbent, said nitrous gases having a degree of oxidation of at least about 0.5, adding $SO_3$ to said absorbent to produce said nitrosating acid.

2. The process of claim 1, wherein the nitrous gases have a degree of oxidation higher than 0.5.

3. The process of claim 1, wherein the absorbent composition comprises $NOHSO_4$, $H_2SO_4$ and $SO_3$.

4. A continuous process for preparing a nitrosating acid which comprises providing a system including a circulating absorbent comprising a solution of nitrosyl sulfuric acid in sulfuric acid, said absorbent being at a temperature between about 0° and about 40° C., continuously absorbing nitrous gates obtained by combustion of ammonia in said circulating absorbent, said nitrous gases having a degree of oxidation of at least about 0.5, thereafter adding $SO_3$ to said absorbent containing the absorbed nitrous gases and continuously discharging the resulting nitrosating acid from said system in an amount corresponding to the amount of absorbed nitrous gases, said absorbent having a composition approximately equal to that of said nitrosating acid.

5. The process of claim 4, wherein the $SO_3$ is added in the form of oleum.

6. The process of claim 5, wherein part of the circulating absorbent containing absorbed nitrous gases is continuously fed from an absorption zone to a mixing zone and admixed with oleum in said mixing zone, a portion of the resulting mixture is fed back into the absorption zone and the balance of said mixture is discharged from the system as nitrosating acid.

7. The process of claim 6, wherein $SO_3$ is fed into said mixing zone and the oleum is prepared in situ.

8. The process of claim 4, wherein the nitrous gases have a degree of oxidation higher than 0.5.

9. A continuous process for preparing a nitrosating acid which comprises providing a circulating absorbent at a temperature between about 0° and about 40° C., said absorbent comprising a solution of nitrosyl sulfuric acid in sulfuric acid and containing free $SO_3$, absorbing nitrous gases obtained by combustion of ammonia in said absorbent in a first absorbing zone, said nitrous gases having a degree of oxidation of at least about 0.5, feeding said absorbent to a second absorbing zone to contact said absorbent with $SO_3$ containing gases, introducing water into said absorbent in an amount at least equivalent to half the molecular amount of $SO_3$ introduced, returning a portion of the resulting solution to the first absorbing zone as the circulating absorbent and discharging the remainder of said solution as nitrosating acid.

References Cited by the Examiner
UNITED STATES PATENTS

| | | | |
|---|---|---|---|
| 1,047,576 | 12/1912 | Schultze | 23—139 |
| 2,752,225 | 6/1956 | Revallier | 23—139 X |

OSCAR R. VERTIZ, *Primary Examiner.*

H. T. CARTER, *Assistant Examiner.*